C. P. HOLLISTER

Dec. 6, 1932. LOCALLY CONTROLLING RADIO RECEIVING APPARATUS Re. 18,689

3 Sheets-Sheet 1

Original Filed May 11, 1928

Inventor

Clarence P. Hollister

Eugene C. Brown

Attorney

C. P. HOLLISTER
Dec. 6, 1932. LOCALLY CONTROLLING RADIO RECEIVING APPARATUS Re. 18,689
3 Sheets-Sheet 2
Original Filed May 11, 1928
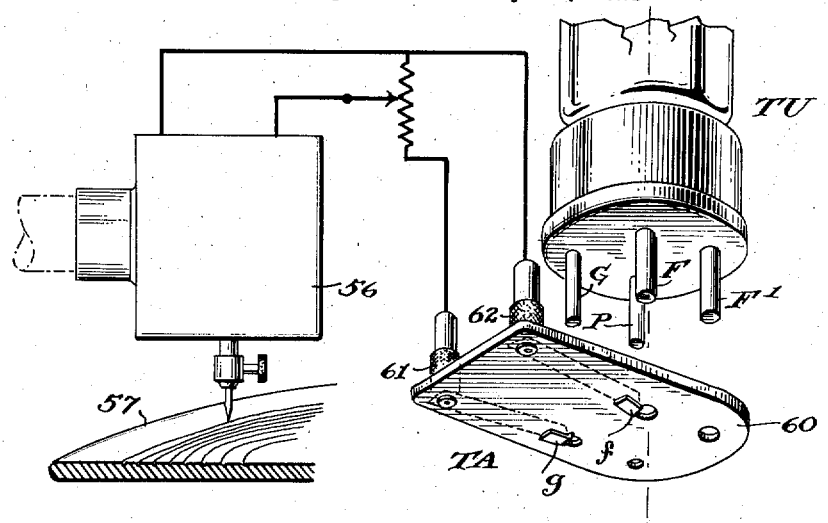
Fig. 5.
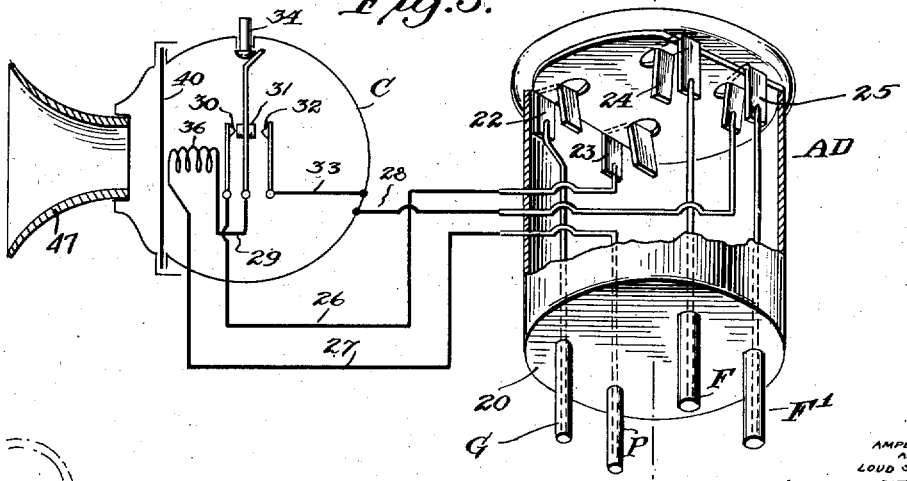
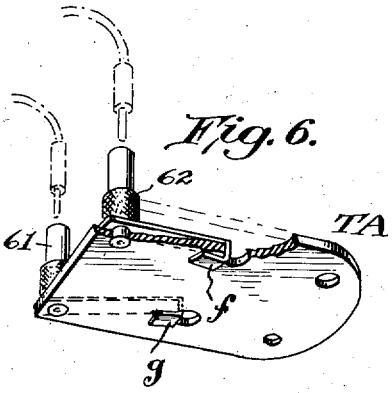
Fig. 6.
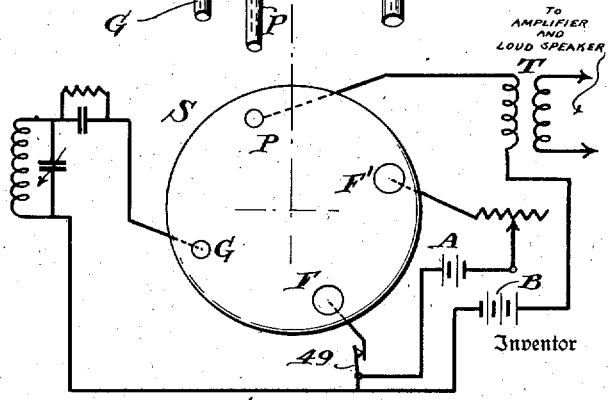
Inventor
Clarence P. Hollister
Eugene C. Brown
Attorney C. P. HOLLISTER
Dec. 6, 1932. LOCALLY CONTROLLING RADIO RECEIVING APPARATUS Re. 18,689
3 Sheets-Sheet 3
Original Filed May 11, 1928
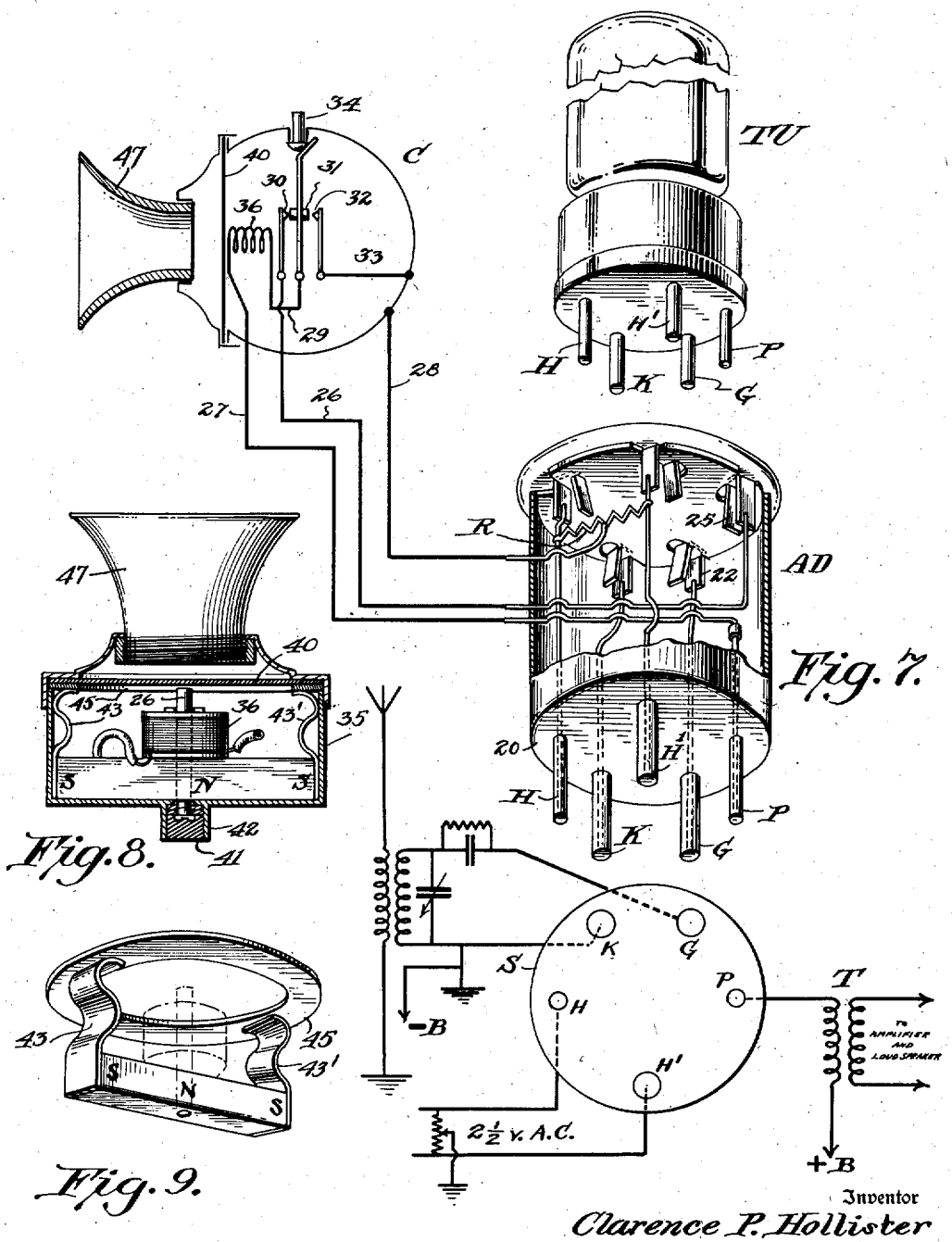
Inventor
Clarence P. Hollister
Eugene C. Brown
Attorney Reissued Dec. 6, 1932 Re. 18,689

UNITED STATES PATENT OFFICE

CLARENCE P. HOLLISTER, OF COLD SPRING, NEW YORK, ASSIGNOR TO THE BROOKLYN METAL STAMPING CORPORATION, OF BROOKLYN, NEW YORK, A CORPORATION OF NEW YORK

LOCALLY CONTROLLING RADIO RECEIVING APPARATUS

Original No. 1,790,636, dated January 27, 1931, Serial No. 279,116, filed May 11, 1928. Application for reissue filed November 4, 1932. Serial No. 641,324.

This invention relates to the control of radio receiving apparatus and particularly to means for causing the apparatus to reproduce at will locally produced sounds, such as human speech or music.

Radio receiving sets or apparatus have heretofore been employed to reproduce not only signals, musical compositions, and speech received by radio waves but also to reproduce phonograph records. The object of my invention is to provide means for interrupting at will the operation of a radio receiving apparatus and to then impress upon one of the thermionic tubes of the apparatus electrical undulations corresponding to local sounds, such as the voice, so that these local sounds will be reproduced in amplified form.

In order that my invention shall be thoroughly understood I shall refer to the several illustrations of the accompanying drawings in the following description.

Figure 5 is an illustrative view, partly schematic, showing my invention arranged to interrupt and control a radio receiving apparatus which is adapted to reproduce a phonograph record;

Figure 6 is a perspective view, partly broken away, of a tube attachment which I may employ in the organization shown in Figure 5;

Figure 7 is a diagrammatic illustration, partly schematic, showing my invention applied to a radio receiving set using alternating current thermionic tubes;

Figure 8 is a sectional view of the controller, taken on the line 8—8 of Figure 3;

Figure 9 is a perspective view of the magnetic system of the controller.

Figures 1, 2, 3, 4:
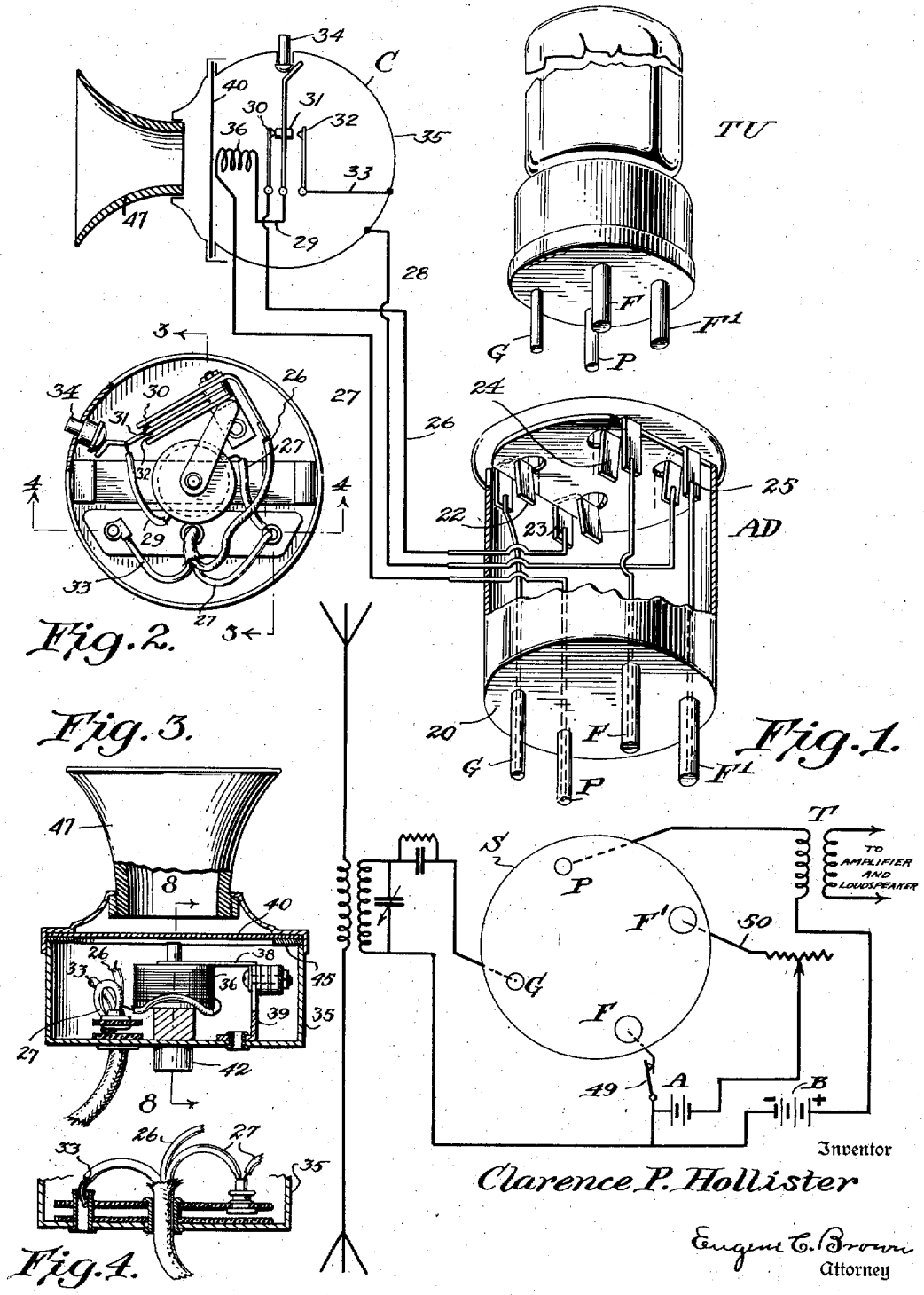
Figure 1 is a diagrammatic illustration, partly schematic, illustrating one embodiment of the invention.
Figure 2 is a top plan view of the controller with the cover removed.
Figure 3 is a transverse sectional view on the line 3—3 of Figure 2.
Figure 4 is a fragmentary detail sectional view on the line 4—4 of Figure 2.

I have illustrated in Figure 1, the usual conventional diagram of the circuits of the detector portion of a radio receiving set including the antenna, the A and B batteries, the detector tube socket S and the transformer T. In order to connect the local controller C in circuit with the grid and filament of the detector tube TU, I provide an adapter AD which is interposed between the tube and the socket. This adapter becomes an adjunct to the tube and in effect is a means of separating the plate prong P into two parts and interposing the controller in the gap between the parts.

I have partly broken away the wall or casing of the adapter AD for the purpose of showing the circuit connections. Four prongs depend from the bottom wall 20 of the casing corresponding in position to the prongs of the usual radio tubes so that they may be inserted in the corresponding apertures in the tube socket S of the ordinary radio set. The top or cover of the casing is provided with apertures arranged in the same manner as the usual tube socket to receive the prongs depending from the tube. Secured to or adjacent the inner wall of the cover are four spring contact members 22, 23, 24 and 25, each having a spring tongue extending into alinement with one of the apertures in the cover, so that when the prongs of a tube are inserted in the apertures, the contacts will engage the respective prongs. The contacts 22, 24 and 25, corresponding to the grid, and filament prongs are connected with the corresponding prongs depending from the bottom wall 20 of the casing; but the contact 23 is not directly connected to the plate prong P, the contact and prong being connected separately with the controller C by conductor wires 26 and 27, which may be conveniently enclosed in a flexible cord or cable.

The controller C comprises a magnetic transmitter provided with a vibratory actuator responsive to sound waves, such as a diaphragm of magnetic material, and a manually controlled switch or circuit changer, all enclosed in a suitable non-magnetic housing or casing.

The circuit controller or switch comprises spring arms carrying contacts 30, 31 and 32 and a push-button 34, by which the central contact 31 may be shifted from engagement with contact 30 over to engagement with contact 32, the latter being grounded by wire 33 to the non-magnetic metal casing 35, to which the adapter contact 25 is also connected by conductor 28. The terminals of the coil 36 are connected respectively to the plate prong of the adapter by wire 27 and to the central switch spring arm by wire 29.

The magneto electric sound responsive device C which operates to superimpose upon the B battery circuit variable currents corresponding to the sound waves which it is desired to amplify through the medium of the radio receiving set must be capable of responding accurately to the most delicate variations and shadings of sound and hence it must produce large variations in the currents generated by the slight movements of the diaphragm. This necessitates a wide range of flux variation through the generating coil 36. I have found, however, that a sudden heavy change in producing sound waves will generate a current impulse of such strength or amplitude as to overpower the capacity of the reproducing unit and cause a disagreeable break or blast in the sound issuing from the loud speaker. This fault is common to all prior magneto-electric sound responsive devices. I have devised a magneto device in which this very great defect has been overcome.

My magneto-electric sound responsive device is particularly illustrated in Figures 2, 3, 4, 8 and 9. The permanent magnet has a south pole at either end and a consequent north pole at the center. A soft iron core *n* of very high permeability extends upwardly from the center and is preferably threaded through a central hole. The outer end of the core is rigidly braced by a non-magnetic strap 38 belted to a bracket 39 which is riveted to the bottom of the casing. The air-gap between the end of the core and the diaphragm 40 is adjusted with great precision by means of a tool applied to the inner notched end of core and it is then permanently secured by means of a sealing material 41 covering the end within a cap or annular flange 42.

Flat steel spring members 43, 43[1] are held tightly against the ends of the magnet, being wedged between the casing and the ends of the magnet. A flat circular iron ring 45 bears upon the inturned outer ends of the spring members 43, 43[1] and supports the thin steel disk 40 which forms the vibratory diaphragm. The cover carries a mouth-piece 47. When the cover is forced down in position on the casing it presses the diaphragm and ring inwardly against the tension of the flat springs 43, 43[1] so that the diaphragm and ring are held tightly together and in firm contact with the spring members, thereby establishing a good magnetic path for the magnetic flux. As stated above, the small air-gap between the outer end of the core *n* and the diaphragm is established with great precision to thereby accurately regulate the reluctance of the magnetic circuit. This is adjusted until the instrument responds with greatest sensitiveness and clearness.

The core member *n* which is of soft iron, such as Swedish iron, possesses a very high permeability so that it permits rapid changes in magnetic flux due to slight changes in the air-gap as the diaphragm is vibrated by sound waves. The currents induced in the coil 36 will vary in frequency and in intensity in proportion to and synchronously with the changes in magnetic flux in the core. While the reluctance of the magnetic path can be fixed or determined with precision for the neutral or normal position of the diaphragm by adjusting the width of the air-gap to thereby control the sensitiveness or responsiveness of the instrument, yet this will not determine the maximum flux which may be suddenly produced in the core when a sudden violent explosion of sound waves strikes the diaphragm. I have found that such a sudden explosive force may so decrease the air-gap as to unduly augment the magnetic flux with a consequent production of an excessive voltage sufficient to produce a blast or break in the note issuing from the loud speaker unless special means are provided to prevent said excessive increase in the magnetic flux.

Accordingly I have so constructed a certain portion of the magnetic system that its flux carrying capacity is limited to a definite maximum or so that it will become saturated by a magnetic flux which will be insufficient to induce a voltage in the generating coil 36 sufficient to produce a break or blast in the sounds issuing from the loud speaker connected to the radio receiving set. I accomplish this purpose making the end members 43, 43[1] of flat spring steel which has a much greater reluctance than the core member and hence will not respond as quickly to sudden changes and is made of a thickness which limits the cross section to dimensions which become saturated before the magnetic flux is sufficient to induce the undesired high voltage. I have found in practice that it is impossible to produce a blast in the loud speaker by subjecting the magnetic transmitter of my controller to sudden loud or explosive noises.

The operation of my invention as disclosed in Figure 1 will be apparent from the previous description of the apparatus. The radio tube TU is inserted in the adapter AD and the prongs of the latter are then inserted in the apertures in the tube socket S of the radio receiving set. When the battery switch 49 is closed the set will operate under the control of the radio waves coming in over the antenna in the normal manner. It will be seen that the grid and filament prongs of the tube are in direct connection with the tube socket through the contacts 22, 24 and 25 of the adapter. The circuit from the plate of the tube, however is through contact 23 of the adapter, conductor 26, switch contacts 30 and 31 and transmitter coil 36 of the controller C, conductor 27 and prong P of the adapter to the tube socket S.

When it is desired to interrupt the radio reception and to reproduce and amplify local sounds through the radio set, the operator presses with the finger on the switch pin 34, thereby moving contact 31 away from contact 30 and into engagement with contact 32, thereby breaking the circuit from the plate of the tube. Vocal or other sounds now entering the mouthpiece of the controller will vibrate the diaphragm 40 and thereby induce alternating electrical potentials corresponding to the sound waves in the generating coil 36 and these in turn will be superposed upon the voltage of the B battery to be amplified in the radio set and reproduced in the loud speaker. The circuit in which these voltages generated in the coil of the controller are superposed upon the voltage of the B battery may be traced from positive pole of B battery through the primary of transformer T, the plate socket and prong P of the adapter, conductor 27, generator coil 36, contacts 31 and 32, conductors 33 and 28, contact 25 and prong $F^1$ of the adapter, conductor 50, A battery back to the negative pole of B battery. I am thus enabled to locally control the operation of the radio receiving set at will, to interrupt the reception of the radio waves by the set and to amplify locally produced vocal, musical or other sounds.

Radio receiving sets have heretofore been arranged to reproduce phonograph records through the usual amplifier portion of the set and the loud speaker. I have illustrated in Figure 5, the application of my invention to the control of a radio receiving set when thus used with a "pick-up" operated by a phonograph record.

In the organization shown in Fig. 5, the varying voltages induced in the "pick-up" device 56 which is being actuated from a phonograph record 57, are impressed directly upon the grid of the detector tube and control its operation in the same manner as it is usually controlled by the radio waves so that I retain the full amplification derived from the use of this tube. I use the same controller C and adapter AD shown in Figure 1 and previously described. In order to connect the phonograph pick-up device with the grid and filament of the detector tube, I provide an attachment to be applied to the prongs of the tube, illustrated in Figures 5 and 6. A plate 60 of any suitable insulating material is provided with holes positioned to receive the prongs of the tube. Spring contacts *g* and *f* are arranged to project through or in alignment with the holes which receive the grid and plate prongs. These contacts are connected to suitable binding posts 61 and 62 which receive the ends of the conductors leading from the pick-up device.

The operation of the arrangement shown in Figure 5 will be evident. When the tube attachment TA is slipped over the prongs of the tube TU, the latter is inserted in the adapter AD, which is then inserted in the tube socket S. The conductors from the pick-up are then in direct connection with the grid and filament of the tube. The coil 36 and switch contacts 30 and 31 of the controller are included in the plate circuit. The radio set will therefore reproduce the record of the phonograph record, but may be interrupted for the substitution of vocal or other sounds impressed upon the transmitter of the controller in the same manner as described in connection with Figure 1.

It will be evident to engineers and those familiar with radio apparatus that my invention may be used with the alternating current type of radio tube, usually referred to as an A. C. tube. I have shown the arrangement in Figure 7. As is well known, the cathode K of an A. C. tube is connected to the negative pole of the B battery, the filament being used merely to radiate heat to the cathode. It is only necessary to slightly modify the adapter by connecting the conductor 28 to an intermediate point between the legs of the filament or heater. I therefore provide a resistance R connecting the heater prongs of the adapter and connect the conductor 28 to its middle point.

The operation of the arrangement shown in Figure 7 will be understood from the previous description. When the tube has been inserted in the adapter and the latter is inserted in the detector socket S of the radio receiving set, the set will be actuated by the radio waves received over the antenna in the usual manner. When the switch button or pin 34 of the controller is depressed to disconnect contact 30 and connect 31 and 32, the radio set will then respond to sounds impressed upon the diaphragm of the transmitter. The plate of the tube is cut out at the open contact 30. The varying potentials induced in the generator coil 36 of the transmitter are superposed upon the voltage of the B battery through a circuit as follows: from positive terminal of B battery through the primary of transformer T, prong P of adjuster AD, conductor 27, coil 36, contacts 31, 32, conductors 33 and 28, to the mid-point of resistance R, through the prongs H, $H^1$ and A. C. conductors to the grounded minus pole of the B battery.

I have illustrated my invention in connection with radio receiving sets using tubes of either the D. C. or the A. C. type and have shown how it may be used in conjunction with the usual reception of radio waves or in conjunction with the reproduction of phonograph records. Other arrangements and applications will occur to engineers familiar with the operation of radio apparatus. Thus my invention may be used in conjunction with the projection apparatus which combine pictures with vocal sounds, sometimes designated as talking moving pictures, vitaphone, etc. various practical applications will be evident, such as its use for the school and lecture room, and for use in calling cabs and private automobiles at theatre entrances, etc.

I have illustrated the use of the adapter in association with the detector tube of a radio set but it may be used in other parts of the set and with the power amplifier which is frequently employed as an adjunct to a radio set. I have illustrated and described a magneto-electric transmitter as the type which I prefer to use but it will be evident to engineers that I may employ other types of transmitters, such as the microphonic type. In other words I do not in any manner restrict myself to the particular arrangements described herein for the purpose of disclosing the invention.

I claim:—

1. Apparatus for locally controlling a radio receiving set, comprising an adapter having prongs insertable in a radio detector tube socket to engage the contacts thereof, and provided with apertures to receive the prongs of a radio tube and with contacts engaged by said tube prongs, electric connections between the contacts and prongs of the adapter, a magnetic transmitter having a generating coil included in one of said connections, and means for eliminating the plate and superposing the transmitter currents directly upon the original plate circuit of said tube.

2. Means for locally controlling the operation of a radio receiving apparatus, comprising a magnetic transmitter responsive to sound waves and having means for limiting the generated voltages to a predetermined maximum value, and switching mechanism operative at will to eliminate the plate of the detector tube and superpose said sound generated voltages upon the original plate circuit of said tube.

3. The method of operating a radio receiving set which consists in alternatively subjecting it to controlling potentials impressed upon the grid of the detector tube or to locally generated currents superposed upon the original plate circuit of said tube with the plate eliminated.

4. Apparatus for locally controlling a radio receiving apparatus provided with the usual antenna connection, comprising a magnetic transmitter responsive to local sound waves, and means having circuit connections to said transmitter interposed between the radio detector tube and its socket, said transmitter having associated means for subjecting the grid circuit of said detector tube to potentials received over the antenna or for eliminating the plate and subjecting the original plate circuit to currents generated by the transmitter.

5. In an apparatus for locally controlling a radio receiving apparatus provided with an antenna connection, a transmitter device responsive to local sound waves and means providing circuit connections between said transmitter and said radio apparatus, said transmitter device being provided with means for subjecting the radio apparatus at will to the control of potentials received over the antenna or to the control of said transmitter device.

6. A transmitter, adapted to be connected to a radio set, including the sound actuated device and connecting wires, one of said wires adapted to be grounded directly or indirectly to the set, and another adapted for connection with a tube of the set, and a switch as an integral part of said transmitter for cutting off the radio reception and cutting in the transmitter.

7. A transmitter and a casing therefor, adapted to be connected to a radio set, including the sound actuated device and connecting wires, one of said wires adapted to be grounded directly or indirectly to the set, and another adapted for connection with a tube operating to actuate the loud-speaker, and a switch mounted within the casing for cutting off the radio reception and cutting in the transmitter.

8. A transmitter for local broadcasting, including wire connections to a radio set, one of said connections adapted to be applied to a tube operating to actuate the loud-speaker, and another adapted to be grounded directly or indirectly to the set, and a manually operated switch as an integral part of said transmitter for making and breaking said connections, to thereby cut off the radio reception and cut in the local transmitter.

In testimony whereof, I affix my signature.

CLARENCE P. HOLLISTER.